United States Patent [19]

Cocker et al.

[11] 3,945,885
[45] Mar. 23, 1976

[54] MEANS FOR SUPPORTING NUCLEAR FUEL

[75] Inventors: Peter Cocker, Leyland; Michael Anthony Price, Thornton Cleveleys, both of England

[73] Assignee: British Nuclear Fuels Limited, England

[22] Filed: Oct. 1, 1973

[21] Appl. No.: 402,384

[30] Foreign Application Priority Data
Oct. 17, 1972 United Kingdom............... 47862/72

[52] U.S. Cl..................................... 176/78; 176/79
[51] Int. Cl.² ...................... G21C 3/10; G21C 3/32
[58] Field of Search ............ 176/29, 30, 66, 67, 73, 176/75, 76, 78, 79, 81

[56] References Cited
UNITED STATES PATENTS 3,303,099  2/1967  Johnston............................... 176/79
3,671,394  6/1972  Bernath et al. ....................... 176/81
3,743,578  7/1973  Agranier et al....................... 176/76

Primary Examiner—Stephen C. Bentley
Attorney, Agent, or Firm—Larson, Taylor and Hinds

[57] ABSTRACT

A nuclear fuel assembly has a plurality nuclear fuel pins which are extremely long and slender thin walled tubes containing heavy nuclear fuel pellets supported in exceedingly close pitch as a cluster. The end support for supporting these pins vertically locates each pin by a spigot and socket connection of special design. By other connection the pin is positioned and retained in the cluster whilst it can execute limited changes in length, and can when necessary be detached from its support by a force which may distort the connection but will not put the integrity of the fuel can as a fuel container at risk.

3 Claims, 6 Drawing Figures

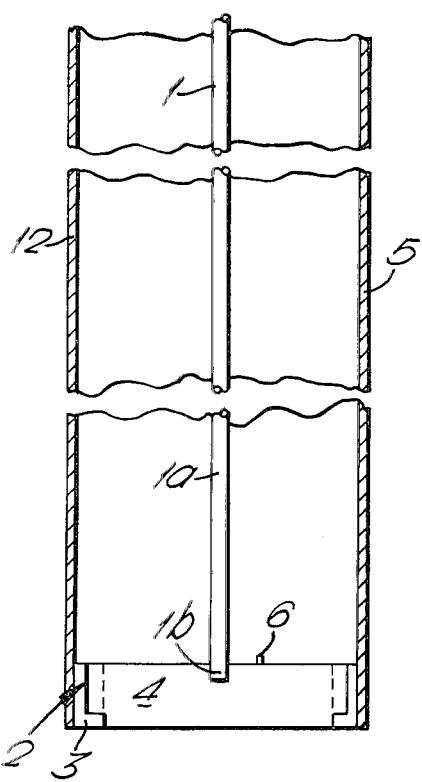
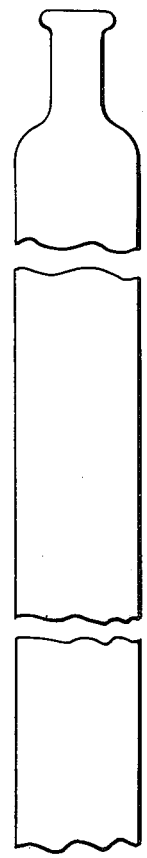
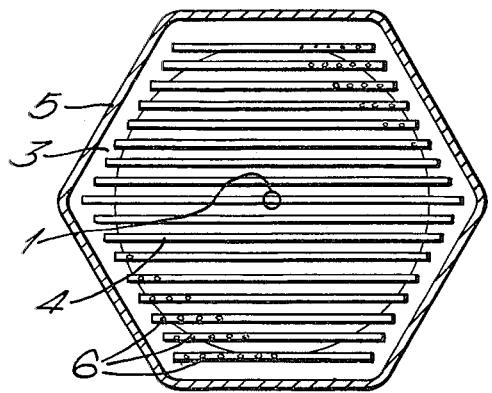
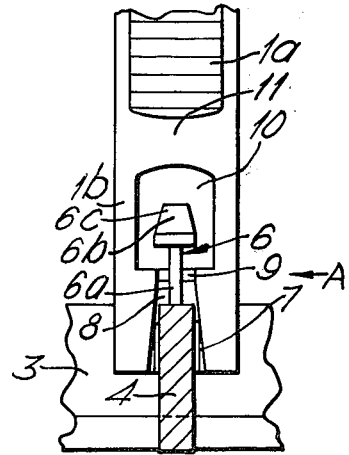
FIG. 1.
FIG. 2.
FIG. 3.

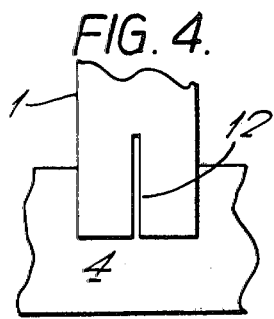
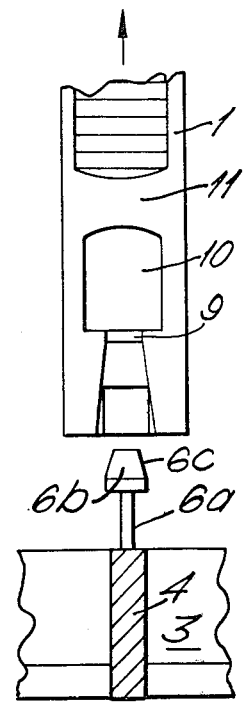
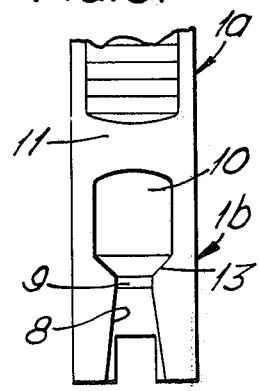

MEANS FOR SUPPORTING NUCLEAR FUEL

BACKGROUND OF THE INVENTION

This invention relates to means for supporting nuclear fuel pins in a coolant channel of a nuclear reactor. Problems in supporting nuclear fuel pins in nuclear reactors arise from many design restraints unique to these components. For reasons of nuclear reactivity and neutron economy it is a requirement to reduce the parasytic material in a reactor core to a minimum whilst for heat transfer reasons it is desirable to avoid the use of fuel pins having a large cross-sectional area. A consequence of these design considerations is that the fuel pin tends to be a very long thin object with the fuel can of minimum thickness such that the pin with its heavy metal oxide filling is hardly self-supporting in other than a vertical attitude and it is in this attitude it must be supported in a nuclear reactor core. Typically the fuel pin may have a length/diameter ratio of 500/1 and, in the case of a fast reactor fuel pin, the outside diameter may be about 0.2 inches. Furthermore for reactor physics reasons, these long, slender, pins must be spaced very close together. As an example, a fast reactor fuel assembly may require that some 2–300 fuel pins, each a few tenths of an inch diameter, be supported end on to coolant flowing up a channel about 22 square inches in total area. Eventually, of course, the fuel pins, having suffered irradiation, must be withdrawn from the fuel channel by an upward pull which must dislodge the pin without the risk of breaching the can as a fuel (and fission product) container.

It will be appreciated from the foregoing that the design of fuel pin support can be a matter of some complexity.

SUMMARY OF THE INVENTION

According to the present invention a nuclear fuel assembly comprises a number of metal clad fuel pins retained in parallel spaced relationship in a common support structure, each fuel pin having a fuel containing portion and an end fitting portion, the latter portion co-operating with the support structure in such a manner as, on the one hand to retain the fuel pin in position in the assembly whilst allowing the pin to execute limited charges in length and, on the other hand, to allow separation of the fuel pin from the support structure after the application of forces which distort the end fitting whilst the integrity of the fuel containing portion is maintained. Preferably the common support comprises an annular member supporting a row of deep cross beams. At closely spaced intervals along each beam is secured upstanding one component of special spigot and socket coupling, the other component of which is carried by the lower end of the fuel can. Where it is desired to preserve a specific, rotational, orientation of the fuel pin in the assembly and restrain the pins against rotation, a special formation on the end fitting may be incorporated to achieve this effect.

DESCRIPTION OF THE DRAWINGS

The invention will now be described with reference to the following diagrammatic drawings in which FIG. 1 is an axial cross-section of a nuclear fuel assembly, one pin only being shown;

FIG. 2 is a plan view of FIG. 1;

FIG. 3 is an axial cross-section through the lower end of a nuclear fuel pin showing part of its fuel containing portion and is extension;

FIG. 4 is an external view of FIG. 3 as seen in the direction of arrow A;

FIG. 5 is a view of FIG. 3 with the fuel pin separated from the support structure and FIG. 6 is a similar view to FIG. 1 showing an alternative configuration of and fitting.

DESCRIPTION OF THE PREFERRED EMBODIMENT

Referring firstly to FIGS. 1 and 2, a nuclear fuel assembly is shown to comprise a number of metal clad fuel pins 1 retained in parallel, spaced relationship in a common, bottom support structure 2. Each pin 1 has fuel containing portion 1a and a lower extension 1b which forms a locating support member. The support structure 2 comprises an annular member 3 having a plurality of beams 4 extending characterise across the member 3, each beam 4 being a deep plate supported at its ends by the member 3. An open ended wrapper tube 5 of hexagonal cross-section is fastened to the periphery of the annular member. Secured to each beam 4 and upstanding from its upwards directed face is a row of locating members in the form of spigots 6 which is dimensioned to enter as a push fit a socket 7 in the lower extension 1b of the fuel pin. To space the fuel pins from one another along their length each is externally wrapped with wire (not shown) along a helical path on the pin surface, alternatively a spacer grid may be used.

To form an assembly of this nature it is necessary to place the support structure on flat base with its tubular wrapper attached and to lower the fuel pins which may be up to 8 feet long one by one into the wrapper so that the locating support member on the fuel pin engages the spigot 6 on the beam. As the pins are spaced closer than the pin diameter the support means for each pin must lie within the diameter of the fuel containing portion of the pin. The means of effecting this are shown in FIGS. 3, 4.

Referring now to FIGS. 3 and 4, parts of the support means shown are the annular member 3, a beam 4 in cross-section and a spigot 6. The latter comprises a stem 6a secured to the top face of the beam and upstanding therefrom and an enlarged head 6b with a tapered surface 6c. Those parts of the fuel pin 1 shown are the lower end of the fuel containing portion 1a and the locating support member 1b formed as an extension of the fuel pin. The member 1b has a socket 7 the entry to which is a tapered hole 8 leading through a neck portion 9 to a cavity 10 of enlarged cross-section. The axial length of the stem 6a on the spigot 6 is less than the axial length of the tapered hole 8 and the extremity of the socket 7 is bifurcated so that it straddles the underlying beam 4. This latter feature prevents rotation of the pin relative to the support structure. The cavity 10 has a generous axial length so that the pin can lift from its hard down position on its support structure, for example as by being levitated by upward coolant flow, but this levitation is limited by the enlarged head 6b. The axial clearance between the top of the cavity and the top of the spigot allows axial length changes of the fuel pin, especially the fuel containing portion which, as shown is separated from the cacity in the extension by a bulkhead section. An upward pull on a fuel pin to remove the pin from the cluster will if large enough separate the spigot and socket by distortion and even fracture of these parts. For example the enlarged head may on the spigot by pulled through the necked portion scuffing the surfaces defining the neck. The stem 6a of the spigot may fracture and the parts separate leaving the head 6b in the cavity 10. Alternatively the pin extension may fracture the wall of the cavity adjacent the bulkhead 11. All these modes of separation involve distortion of the spigot or socket or both.

A further feature may be provided as showing for convenience in FIG. 4. Two slits 11 are cut axially along the centre of each bifurcated half of the socket. The axial length of each slit is approximately equal to the length of the tapered portion of the socket and it allows the socket to be enlarged as the spigot enters it. In a modified form of the socket shown in FIG. 6, the surfaces of the cavity adjacent the neck are tapered at 13 similarly to the taper on the lower side of head of the spigot 6. This taper will ease the withdrawal of the spigot head from the cavity and hence from the socket.

We claim:

1. A nuclear fuel assembly comprising: a number of metal clad fuel pins having a fuel containing portion and an end extension shaped as a locating member, a support for supporting the fuel pins vertically from below the support, comprising an annular member having a plurality of spaced beams extending chordwise across the annular member, rows of support members upwardly projecting from said beams, each of said fuel pins being supported by the support by co-operation between its locating member and one of said support members, said locating members and support members being shaped as co-operating spigots and sockets, whereof each spigot has an enlarged head portion which enters through a necked portion of the socket into a cavity of the socket as a force fit, the members being separable only by distortion of at least one of said members without breaching the fuel containing portion of the metal clad fuel pin.

2. A nuclear fuel assembly as claimed in claim 1 in which the spigot comprises a stem upstanding from the beam and having an enlarged head portion at the end of the stem.

3. A nuclear fuel assembly as claimed in claim 1 in which the spigot and socket have complementary tapers which lead spigot and socket into engagement, the tapered portion of the socket being bifurcated to straddle the beam from which the spigot extends.

* * * * *